United States Patent
Braford, Jr. et al.

(10) Patent No.: US 8,714,326 B2
(45) Date of Patent: May 6, 2014

(54) DUAL CLUTCH MECHANISM FOR A TRANSMISSION

(75) Inventors: Thomas E. Braford, Jr., Brighton, MI (US); Hans Juergen Hauck, Schwaebisch Hall (DE)

(73) Assignee: BorgWarner Inc., Auburn Hills, MI (US)

( * ) Notice: Subject to any disclaimer, the term of this patent is extended or adjusted under 35 U.S.C. 154(b) by 782 days.

(21) Appl. No.: 11/914,689

(22) PCT Filed: May 17, 2006

(86) PCT No.: PCT/US2006/019162
§ 371 (c)(1),
(2), (4) Date: Sep. 16, 2008

(87) PCT Pub. No.: WO2006/125046
PCT Pub. Date: Nov. 23, 2006

(65) Prior Publication Data
US 2009/0211865 A1 Aug. 27, 2009

Related U.S. Application Data

(60) Provisional application No. 60/681,653, filed on May 17, 2005.

(51) Int. Cl.
*F16D 25/06* (2006.01)
(52) U.S. Cl.
USPC .................................................. 192/48.609
(58) Field of Classification Search
USPC ............... 192/48.618, 48.609, 48.611, 85.25, 192/106 F, 70.11, 87.11, 113.35
See application file for complete search history.

(56) References Cited

U.S. PATENT DOCUMENTS

| | | | | |
|---|---|---|---|---|
| 3,581,858 | A  * | 6/1971 | Haley | 192/106 F |
| 5,887,690 | A  * | 3/1999 | Haupt | 192/48.611 |
| 6,386,382 | B1 * | 5/2002 | McCausland | 220/4.21 |
| 6,499,578 | B1 * | 12/2002 | Kundermann et al. | 192/48.618 |
| 6,715,597 | B1 | 4/2004 | Buchanan et al. | |
| 6,758,786 | B2 * | 7/2004 | Lepelletier | 475/296 |
| 6,799,578 | B2 * | 10/2004 | Snaidr et al. | 131/365 |
| 6,935,984 | B2 * | 8/2005 | Tiesler et al. | 475/276 |
| 7,036,645 | B2 * | 5/2006 | Sowul et al. | 192/48.91 |
| 7,104,381 | B2 * | 9/2006 | Miyazaki et al. | 192/48.611 |
| 7,249,665 | B2 * | 7/2007 | Heinrich et al. | 192/48.61 |
| 2006/0266614 | A1 * | 11/2006 | Maguire et al. | 192/85 AA |

FOREIGN PATENT DOCUMENTS

| | | |
|---|---|---|
| DE | 10146606 | 10/2003 |
| DE | 10333435 | 10/2005 |
| EP | 1398520 | 3/2004 |

\* cited by examiner

*Primary Examiner* — Troy Chambers
*Assistant Examiner* — Jude Agendia
(74) *Attorney, Agent, or Firm* — BrooksGroup

(57) ABSTRACT

A dual clutch mechanism includes an input shaft, a first output shaft and a second output shaft. The mechanism includes a pair of clutch arrangements each having a set of intermeshed annular driving and driven discs frictionally compressible to selectively drive either the first or second output shaft via the input shaft. Each of the clutch arrangements has a separate driving plate and a common driven plate. The rotational inertia of the driving plates are reduced by associating the driving plates with inner diameters of the annular discs, as opposed to their outer diameters. Cooling and/or lubricating fluid is separately supplied to each of the sets of discs such that the flow rates of fluid to the sets of discs can be independently increased or decreased without a corresponding increase or decrease in the flow rate to the other set of discs.

24 Claims, 2 Drawing Sheets

US 8,714,326 B2

DUAL CLUTCH MECHANISM FOR A TRANSMISSION

CROSS-REFERENCE TO RELATED APPLICATIONS

This application is a U.S. national phase application filed under 35 U.S.C. §371 of International Application PCT/US2006/019162, filed on May 17, 2006, designating the United States, which claims the benefit of U.S. Application No. 60/681,653, filed May 17, 2005, which are hereby incorporated herein by reference in their entirety.

FIELD

The invention relates generally to a clutch mechanism for a transmission, and in particular to a dual clutch mechanism for a transmission.

BACKGROUND

Dual clutch mechanisms typically have a single input shaft that, through a pair of selectively engageable plate clutch mechanisms, drives one of a pair of output shafts for rotation. One example of such an arrangement uses an input shaft positioned within a hollow inner output shaft, which in turn is positioned within a hollow outer output shaft.

Such dual clutch mechanisms typically have a first clutch arrangement which has a driven side and a driving side, along with a second clutch arrangement which also has driven side and a driving side. The selective activation of either of the first and second clutch arrangements allows for the input shaft to drive one of the inner and outer output shafts. The driven side the first and second clutch arrangements is driven for rotation via the input shaft, which is disposed within both the inner and outer output shafts. The driving side of the first clutch arrangement selectively drives one of the inner and outer output shafts for rotation, while the driving side of the second clutch arrangement selectively drives the other of the inner and outer output shafts for rotation.

Dual clutch mechanisms can be used in automotive transmission systems, such as for shifting between gears in an automatic transmission. A consideration in configuring a dual clutch mechanism for a particular automobile can be the size of the mechanism, and in particular the overall radial extent of the mechanism. In general, a reduced overall radial extent of the dual clutch mechanism can beneficially provide for greater flexibility in its arrangement within an automobile. Another consideration in configuring a dual clutch mechanism for a particular automobile can be the size and torque capacity of the gear selectors, such as synchronizers, for engaging gears with the output shafts of the dual clutch transmissions. The size and capacity of the gear selectors is determined in part by the forces imparted to the output shafts by the dual clutch mechanism. In general, the more torque capacity that is required of the synchronizer, the larger and more costly the synchronizer is.

The clutch mechanisms can include a plurality of annular discs associated with the driven side of each of the clutches intermeshed with a plurality of annular discs associated with the driving side of each of the clutches. The intermeshed discs are selectively engageable to permit the driven side of the clutch to drive the driving side of the clutch for rotation.

Typically the driven or input side of the clutch arrangements are driven for rotation via driven plates connected to inner diameters of the annular driven discs and the driving or output side of the clutch arrangements drive driving plates connected to outer diameters of the annular driving discs. Such a driving path via the radially outward diameters of the clutch arrangements can result in a large rotational inertia which must be overcome to accelerate the driving plates to the same speed as the intermeshed driven plates. The required forces to overcome the rotational inertia associated with having the driving plates of the clutch arrangements connected via the radially outward diameter of the clutch arrangements can adversely impact the ability to rapidly shift between gears associated with different output shafts by increasing the time require to accelerate the driving discs to the same speed as the driven discs, and can require increased capacity synchronizers.

Fluid is supplied to intermeshed driving and driven discs to permit cooling and/or lubrication during their frictional engagement. However, fluid is also typically also supplied to the driving and driven discs when unengaged. Switching from transmitting torque with one of the output shafts associated with a lower effective gear ratio to transmitting torque with the other of the output shafts associated with a higher effective gear ratio involves first accelerating the other of the output shafts prior to engagement of the driving and driven discs of that output shaft. Clutch drag due to fluid between the unengaged driving and driven discs as well as other components can slow the acceleration of the driving discs in the unengaged set of discs prior to their engagement, thereby decreasing the response time of the dual clutch mechanism and requiring synchronizers having a greater torque capacity to overcome the clutch drag in the dual clutch mechanism.

Dual clutch mechanisms can have the first and second clutch arrangements positioned parallel to each other along the principle axis of rotation of the clutch mechanism. An example of a parallel dual clutch mechanism is disclosed in EP1195537. As shown in the '537 publication, however, the output shafts often are driven via the outer diameters of the driving discs of the clutch arrangements.

Accordingly, it is desired to provide a dual clutch mechanism that provides flexibility in the design, installation, and selection of both the dual clutch mechanism itself and transmission components, such as synchronizers, installed within the engine compartment. In particular, it is desired to provide a dual clutch mechanism that is reduced in cost and can operate with a reduced complexity of design constrictions.

SUMMARY

A dual clutch mechanism having first and second clutch arrangements each having a set of intermeshed, annular driving and driven discs is provided that is configured to have both reduced rotational inertia on the output or driving side and reduced clutch drag. In one aspect, the dual clutch mechanism has a first output shaft associated with the driving discs of the first clutch arrangement and a second output shaft associated with the driven discs of the second clutch arrangement. A common input shaft is associated with the driven discs of both the first and second clutch arrangements. The first output shaft is driven for rotation by the input shaft when the driving and driven discs of the first clutch arrangement are frictionally compressed, and the second output shaft is driven for rotation by the input shaft when the driven and driven discs of the second clutch arrangement are frictionally compressed.

In this aspect, to reduce the rotational inertia on the driving side of the first and second clutch arrangements, the first output shaft is associated with an inner diameter of the driving discs of the first clutch arrangement and the second output shaft is associated with an inner diameter of the driving discs of the second clutch arrangement. Such an arrangement will reduce rotational inertia on the driving sides of the first and second clutch arrangements as compared to when the first output shaft is associated with an outer diameter of the driving discs of the first clutch arrangement and the second output shaft is associated with an outer diameter of the driving discs of the second clutch arrangement.

In another aspect, the dual clutch mechanism is also configured to permit independent control of the flow rate of cooling and/or lubricating fluid to the driving and driven discs of the first clutch arrangement and the driving and driven discs of the second clutch arrangement. Switching from transmitting torque with one of the output shafts associated with a lower effective gear ratio to transmitting torque with the other of the output shafts associated with a higher effective gear ratio involves first accelerating the other of the output shafts prior to engagement of the driving and driven plates of that output shaft. In order to reduce the clutch drag due to the interaction of the cooling and/or lubricating fluid with the driving and driven discs and other components of the unengaged set of driving and driven discs, the flow rate of fluid to that set of discs can be decreased without a corresponding decrease in flow rate to the set of engaged driving and driven discs.

More specifically, providing separately controllable flow rates to the first and second clutch arrangements permits decreasing the first flow rate when the driving and driven discs of the first clutch are unengaged effective to reduce clutch drag without a corresponding decrease in the second flow rate when the driving and driven discs of the second clutch are engaged. Conversely, the second flow rate can be decreased when the driving and driven discs of the second clutch are unengaged for a similar reduction in clutch drag without a significant adverse effect on the first flow rate of cooling and/or lubrication fluid to the first clutch. The reduced clutch drag can improve the response time of the dual clutch mechanism and reduce the torque requirements of the system required to overcome the reduced clutch drag.

Thus, in this aspect the combined reduction in the rotational inertia required to drive the output shafts and the reduction in the clutch drag can advantageously allow for reduced shifting time between gears driven by the output shafts and reductions in the torque capacity, complexity and cost of the shift selectors, such as synchronizers, providing a dual clutch mechanism that can be more cost effective and more efficient than prior designs.

In another aspect, the driving discs of the first clutch arrangement are associated with a first driving plate and the driving discs of the second clutch arrangement are associated with a second driving plate. The first driving plate is operably connected to the first output shaft for rotation therewith and the second driving plate is operably connected to the second output shaft for rotation therewith. The driven discs of the first and second clutch arrangements are each associated with a common driven plate. The common driven plate, and thus the driven discs of both the first and second clutch arrangements, is driven for rotation via the input shaft. Thus, when the driving and driven discs of the first clutch arrangement are engaged, the input shaft drives the first output shaft through the common driven plate, the engaged set of discs and the first driving plate, and when the driving and driven discs of the second clutch arrangement are engaged, the input shaft drives the second output shaft through the common driven plate, the engaged set of discs and the second driving plate.

In yet another aspect, each of the first and second clutch arrangements has an associated pressure apply chamber and an associated balance chamber. The pressure apply chamber and the balance chamber are separated at least in part by an apply piston. The apply piston for the first clutch arrangement has an apply position where the piston is arranged to frictionally engage the driven set of clutch discs associated with the common driven plate and the driving set of clutch discs associated with the first driving plate to drive the first driving plate in rotation with the common driven plate when sufficient pressure is applied in the pressure apply chamber of the first clutch arrangement, and thus to permit the input shaft to drive the first output shaft for rotation therewith.

Similarly, the apply piston for the second clutch arrangement has an apply position where the piston is arranged to frictionally engage the driven set of clutch discs associated with the common driven plate and the driving set of clutch discs associated with the second driving plate to drive the second driving plate in rotation with the common driven plate when sufficient pressure is applied in the pressure apply chamber of the second clutch arrangement, and thus to permit the input shaft to drive the second output shaft for rotation therewith. The apply pistons each also have an unapplied position where the piston is not arranged to frictionally engage the driven and driving set of clutch discs of the respective first and second clutch arrangements so the respective driving plate is not in rotation with the common driven plate.

Driving the output shafts from the inner diameters of the driving discs of the first and second clutch arrangements can require rearrangement and/or modification of various components of the dual clutch mechanism. In another aspect, the fluid flow path for supplying cooling and/or lubrication fluid to the driven and driving discs of one of the first and second clutch arrangements may include a portion through an aperture in the apply piston for one of the first and second clutch arrangements. According to one aspect, the fluid flow path for supplying cooling and/or lubrication fluid to the driven and driving discs of one of the first and second clutch arrangements may include a portion through an aperture in the driving plate of the other of the first and second clutch arrangements. According to yet another aspect, the piston of one of the first and second clutch arrangements can include a segment that is positioned radially outward from the driving and driven discs, and can include a segment that extends through an opening in an adjacent segment of the common driven plate.

In one aspect, separately controllable fluid flow rates are provided for supplying fluid to the pressure apply chamber of the first clutch arrangement and to the pressure apply chamber of the second clutch arrangement. Separately controllable fluid flow rates also can be provided for supplying fluid to the balance chambers of the first clutch arrangement and the second clutch arrangement. These separately controllable fluid flow rates, in combination with the separately controllable fluid flow rates of the cooling and/or lubricating fluid to each of the first and second clutch arrangements, can advantageously permit for improved control and responsiveness of the dual clutch mechanism.

In another aspect, a reduced overall radial extent of the dual clutch mechanism can be provided by either axially spacing both the concentric output shafts from the input shaft or by axially spacing one of the concentric output shafts from the input shaft.

It should be understood that the above figures are not necessarily to scale. In certain instances, details of the actual structure shown in the figures which are not necessary for the understanding of the present invention have been omitted. It should also be understood that the figures are provided to illustrate an example of the invention and that the invention is not necessarily limited to the particular example and aspects discussed herein.

DETAILED DESCRIPTION OF THE DRAWINGS

Figure 1:
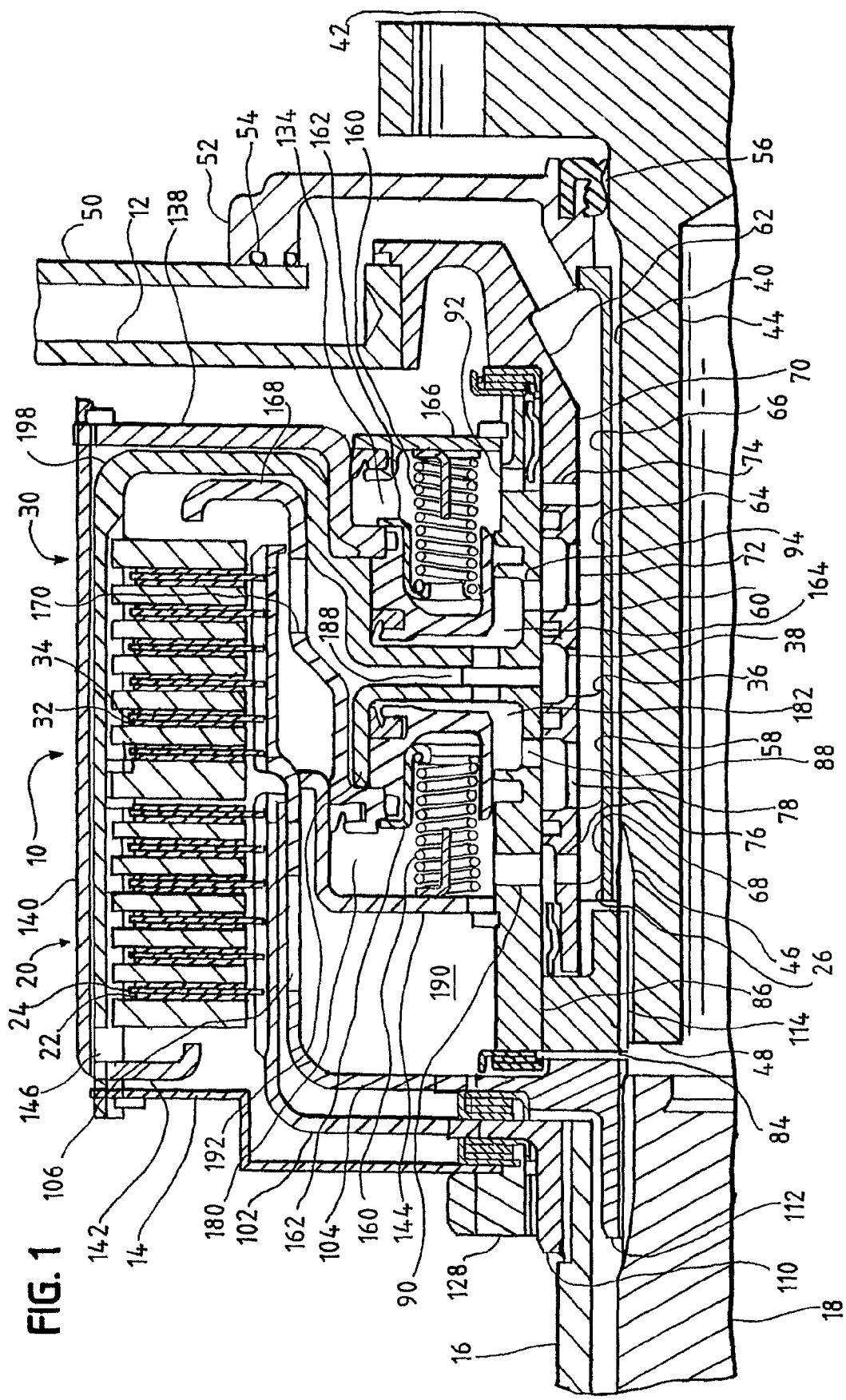
FIG. 1 is a sectional view of a parallel clutch arrangement having a concentric pair of output shafts both axially spaced from an input shaft.
Figure 2:
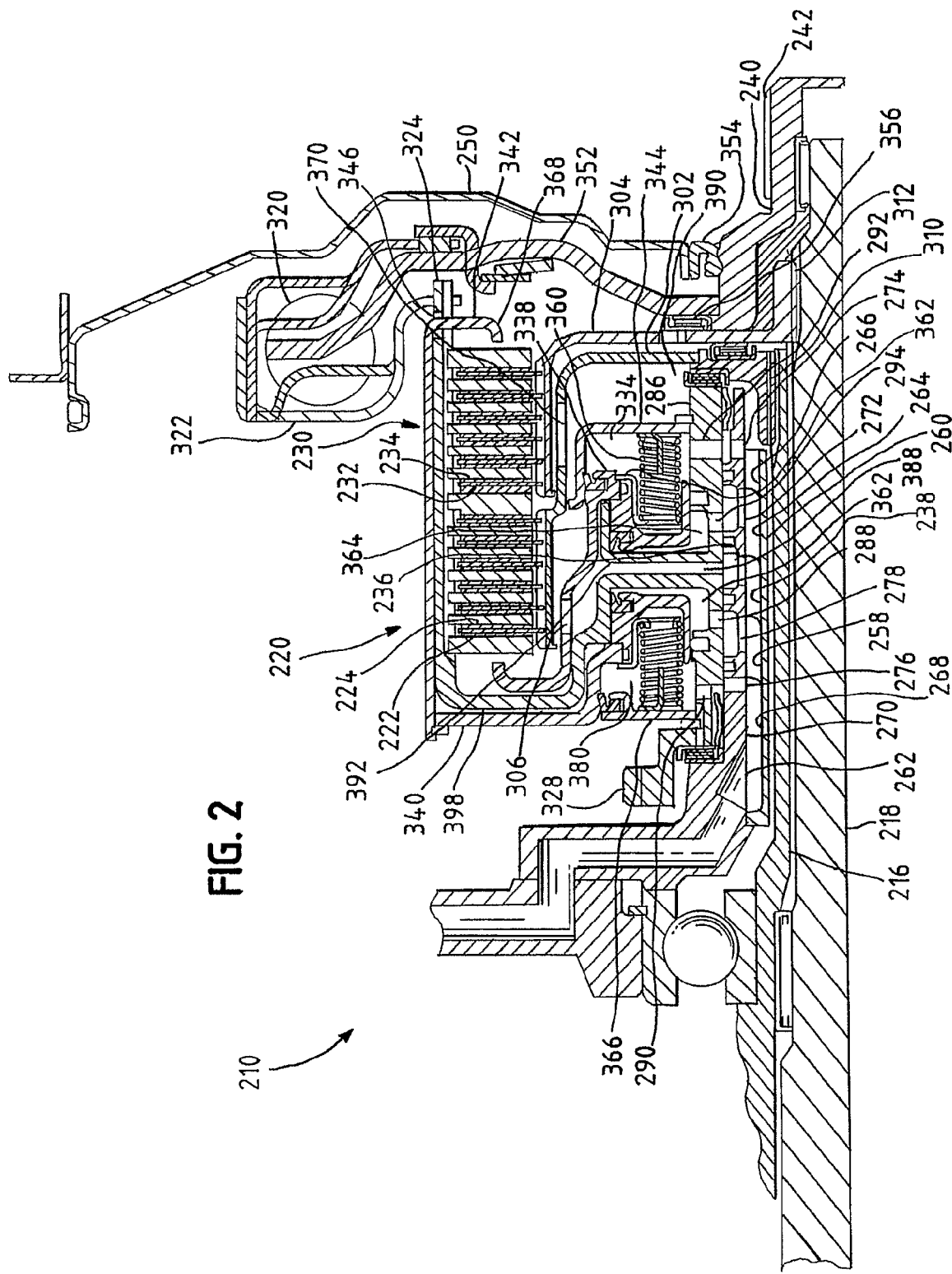
FIG. 2 is a sectional view of a parallel dual clutch arrangement having a concentric pair of output shafts where one of the output shafts is axially spaced from an input shaft and the other of the output shafts is concentric with the input shaft.

Dual clutch mechanisms, such as illustrated in FIGS. 1 and 2, include an input shaft, a first output shaft and a second output shaft. The dual clutch mechanism also includes a first clutch arrangement and a second clutch arrangement each having a plurality of intermeshed set of annular driving and driven discs. The first and second clutches may be aligned in a parallel relationship, as illustrated in FIGS. 1 and 2. The drive path from the driving side of the first and second clutch arrangements to their respective output shafts is from the inner diameter of the discs, thereby reducing the rotational inertia required to drive the output shafts as compared to having the drive path from the driving side if the first and second clutch arranges be from the outer diameter of the discs.

In addition, the flow rates of the cooling and/or lubricating fluid to the sets of discs in the dual clutch mechanisms are separately adjustable. This permits the reduction of the fluid flow rate to an unengaged set of discs reducing the clutch drag that must be overcome for engagement of the discs, without a corresponding decrease or significant decrease in the fluid flow rate to the engaged other set of discs. Reducing the rotational inertia required to drive the output shafts and the clutch drag can advantageously allow for reduction in time for shifting between gears driven by the output shafts and reduction in torque capacity of the shift selector, such as a synchronizer, which can lead to decreased costs for components of the shift selector, to provide a dual clutch mechanism that can be more cost effective and more efficient.

The dual clutch mechanism of FIG. 1 has a torque path via a clutch hub or support, while the dual clutch mechanism of FIG. 2 has torque path via a common driven plate. The dual clutch mechanism of FIG. 2 also has one of the output shafts concentric with the input shaft, while the output shafts of the dual clutch mechanism of FIG. 1 are axially spaced from the input shaft, as discussed in greater detail below. Moreover, the dual clutch mechanism of FIG. 2 has an integrated torsional vibrational damper to reduce vibrations.

In the parallel dual clutch arrangement 10, as illustrated in FIG. 1, first and second clutch arrangements 20 and 30 are provided. Each of the clutch arrangements 20 and 30 has a driven side and a driving side. The driven side of each of the first and second clutch arrangements 20 and 30 is operably connected to the input shaft 40. The driving side of the each of the first and second clutch arrangements 20 and 30 is operably connected to the output shafts 16 and 18. The first clutch arrangement 20 is connected to the outer output shaft 16 and the second clutch arrangement 30 is connected to the inner output shaft 18. The inner and outer output shafts 18 and 16 are concentric with each other and axially spaced from the input shaft 40, which can lead to a decreased maximum diameter of the dual clutch mechanism, along with increased rigidity of the shafts 16, 18 and 40, as discussed below in greater detail.

Turning first to the driven side of the first and second clutch arrangements 20 and 30, the input shaft 40 is adapted to be driven by a transmission of the engine. One end of the input shaft 40 has a flange 42 and the other end has a spline. The spline is positioned to permit the input shaft 40 to drive a clutch hub 86 via a clutch hub support member 84 which also has a spline for engagement with the spline on the end of the input shaft 40. The clutch hub 86 is operably connected to a centrally disposed common driven plate 198 which has a portion extending radially outward and then another portion extending axially along the radially outward side of the clutch arrangements 20 and 30. The axially extending portion of the common driven plate 198 has a plurality of annular plate clutch members 24 for the first plate clutch arrangement 20 and a plurality of annular plate clutch members 34 for use with the second plate clutch mechanism 30. The common driven plate 198 may be formed of multiple components that are joined together, such as with snap rings.

Turning now to the output or driving side of the clutch device 10, the driving side of the first and second plate clutch arrangements 20 and 30 each include a plurality of annular driving clutch discs 22 and 32 intermeshed with the annular driven clutch plates 24 and 34. The first clutch driving discs 22 are operably connected at their radially inward sides to one end of an output plate 102, and the second clutch driving discs 32 are operably connected at their radially inward sides to one end of another output plate 104. At another end of the fist clutch driving plate 102 is an output plate interface 110. Likewise, at another end of the second clutch driving plate 104 is another output plate interface 112. The interface 110 of the first clutch driving plate 102 and the interface of the 112 of the second clutch output plate 104 each has a spline positioned to engage the splines of the output shafts 16 and 18 in driving arrangement. Thus, the outer output shaft 16 is connected in driving engagement with the radially inward ends of the first clutch driving discs 22 via the first clutch driving plate 102, and the inner input shaft 18 is independently connected in driving engagement with the radially inward ends of the second clutch driving discs 32 via the second clutch driving plate 104.

The rotational inertia of the driving and driven sides of the components of each of the first and second clutch arrangements 20 and 30 is a function of the square of the radial position of the center of gravity of the driving side components and the driven side components and the mass of the driving side components and the driven side components. In particular, the rotational inertia of the driving plates 102 and 104 is a function of the square of the radial position of the center of gravity of each of the driving plates 102 and 104 ($r_{driving}$) and the mass of the driving plates 102 and 104 ($M_{driving}$). The rotational inertia of the driving side components ($I_{driving}$) can be expressed as $I_{driving} = (M_{driving})(r_{driving}^2)$.

Associating the driving plates 102 and 104 with the inner diameters of the driving clutch discs 22 and 32, as compared to their outer diameters, will reduce the rotational inertia due to the driving plates 102 and 104 of each of the first and second clutch arrangements 20 and 30. Given the formula for rotational inertia, the reduction in rotational inertia due to associating the driving plates 102 and 104 with the inner diameters of the driving clutch discs 22 and 32 is due to a combination of a reduced radial position of the center of gravity of each of the driving plates 102 and 104 ($r_{driving}$), as well as a reduced mass ($M_{driving}$) due to the driving plates 102 and 104 not extending to the outer diameters of the driving clutch discs 22 and 32. Assuming that there is not a significant reduction in the mass of the driving plates 102 and 104

($M_{driving}$) as compared to larger driving plates associated with the outer diameters of the discs 22 and 32, as in the prior art, then the reduced radial position of the center of gravity of each of the driving plates 102 and 104 ($r_{driving}$), as compared to prior art driving plates, will have the greater impact on the reduction of rotational inertia. By way of example of the application of the formula to the dual clutch mechanism 10, a reduction in the radial position ($r_{driving}$) of 1.5 inches can reduce the rotational inertia by a factor of 2.25, and a reduction in the radial position ($r_{driving}$) of 2 inches can reduce the rotational inertia by a factor of 4.

This reduction in rotational inertia that must be overcome in turn can lead to reduced torque capacity required to rapidly shift between gears located on the output shafts 16 and 18, and thus reduced size and complexity of shift selectors, such as synchronizers or one-way clutches, for selectively engaging gears with the output shafts 16 and 18. Also, the reduced torque capacity required of the shift selectors can lead to more rapid engagement of gears on the output shafts 16 and 18 using the shift selectors, and thus a more responsive system.

In order to engage the driving clutch discs 22 and 32 with their respective driven clutch plates 24 and 34, an associated piston 138 or 168 is used to compress the discs 22 and 24 or 32 and 34 together into frictional engagement such that the driven plates 24 and 34 drive the driving discs 22 and 32. Each of the first and second plate clutch arrangements 20 and 30 has its associated piston 138 and 168 moveable from a first position to a second position. In the first position, the piston 138 or 168 is disengaged from the clutch 20 or 30, while in the second position the piston 138 or 168 applies pressure to the clutch discs 32 and 34 or 22 and 24 to compress the driven and driving clutches 20 or 30 of each of the clutch arrangements 20 and 30 into frictional engagement. A portion of the common driven plate 198 may include an opening 146 to allow a downward extension 142 of the first apply piston 168 to extend therethrough for compressing the clutch discs 22 and 24 into frictional engagement.

The piston 138 or 168 is shifted from its first to second position when pressure is applied within a pressure chamber 164 or 182. Once sufficient pressure has been applied within the pressure chamber 164 or 182 to overcome a spring biasing force, which biases the piston 138 or 168 to the first position, the piston 138 or 168 is allowed to move to the second position. As illustrated in FIG. 1, the piston 138 has a portion extending radially outward beyond the axially extending portion of the common driven plate 198, a portion 140 extending generally parallel to the axially extending portion of the common driven plate, and a downward extension 142 extending radially inward, as will be discussed herein.

Each of the pistons 138 and 168 may be configured for ease of manufacture and assembly by having two separate components, a lower component and an upper component. Each of the upper components is joined to its respective lower component. A seal can be positioned therebetween to prevent leakage between the components.

The pressure apply chamber 164 for the first plate clutch arrangement 20 is formed between the piston 138 and the radially extending portion of the common driven plate 198. Fluid enters the pressure apply chamber 164 via the fluid passage 64 in the oil distribution sleeve 60, fluid passage 72 in the clutch support 70, and fluid passage 94 in the clutch hub 86. The pressure apply chamber 182 for the second plate clutch arrangement 30 is formed between the piston 168 and a pressure chamber housing member 192, which is secured to the clutch hub 86. Fluid enters the pressure apply chamber 182 via the fluid passage 58 in the oil distribution sleeve 60, fluid passage 78 in the clutch support 70, and fluid passage 88 in the clutch hub 86.

In this example, balance chambers are provided to offset the tendency of the fluid within the pressure chambers 164 and 182 to apply undesirable pressure on the pistons 138 and 168 due to the centrifugal forces acting on the fluids during operation of the clutch. The balance chamber 134 for the first plate clutch arrangement 20 is formed between the piston 138 and a pressure chamber housing member 166. Fluid enters the balance chamber 134 via the fluid passage 66 in the oil distribution sleeve 60, fluid passage 74 in the clutch support 70, and fluid passage 92 in the clutch hub 86. The balance chamber 180 for the second plate clutch arrangement 30 is similar to that of the balance chamber 134, and is formed between the piston 168 and a balance chamber housing member 144.

Within each of the balance chambers 134 and 180 a spring 160 is positioned to bias the respective piston 138 and 168 away from the position where the piston 138 or 168 compresses the clutch discs 22 and 24 or 32 and 34. The springs 160 may be positioned within a common carrier 162 that extends through one of the balance chambers 134. The use of the common carriers 162 simplifies assembly of the dual clutch mechanism 10 by allowing the springs 160 to be placed in their respective carriers 162 inserted into their respective chambers 134 and 180, instead of requiring each spring 160 to be individually placed.

Pressurized operating fluid can be supplied by a pump which drives fluid through a fluid inlet passage 62 to a fluid distribution sleeve 60. The fluid distribution sleeve 60 is coaxial with the input shaft 40, but is rotatably independent relative to the input shaft 40. The clutch hub 86 rotates relative to the clutch support 70 and distribution sleeve 60 when driven by the input shaft 40. A plurality of bearings 82 are disposed between the clutch support 70 and the clutch hub 86 to allow for a relative rotation there between. A plurality of seals 80 are disposed between the clutch support sleeve 70 and the clutch hub 86. The clutch support sleeve 70 is also rotationally independent relative to the inner shaft 40.

The fluid distribution sleeve 60 has five distribution passageways 66, 64, 36, 58 and 68, which may be in the form of channels formed in the exterior surface of the sleeve 60. Each of these fluid distribution passageways 66, 64, 36, 58 and 68 transmits fluid to corresponding fluid passageways 74, 72, 38, 78 and 76 in a clutch support sleeve 70. The fluid passages 74, 72, 38, 78 and 76 of the clutch support 70 are aligned with fluid passages 92, 94, 188, 88 and 90 of the clutch hub. Two of the fluid passages are for the first clutch arrangement 20 and three are for the second clutch arrangement 30.

More specifically, for the first clutch arrangement 20, aligned set of fluid passages 64, 72 and 94 supply fluid to the pressure apply chamber 164, while another aligned set of fluid passages 66, 74 and 92 supply fluid to the balance chamber 134. Similarly, for the second clutch arrangement 30, aligned set of fluid passages 58, 78 and 88 supply fluid to the pressure apply chamber 182, while another aligned set of fluid passages 76, 78 and 90 supply fluid to the balance chamber 180.

Another set of aligned fluid passages 36, 38 and 188 supplies operating fluid, such as for cooling, to the second clutch arrangement 30. A portion of the fluid passage 188 is bounded on one side by the common driven plate 198 and on the other side by the housing member 192 associated with the pressure apply chamber 182 of the second clutch arrangement. The fluid passage 188 to the second clutch arrangement 30 also extends through one or more apertures 170 in the second apply piston 168. Operating fluid, such as for cooling, is supplied to the first clutch arrangement 20 via fluid passageway 190. An end of the fluid distribution sleeve 60 has an open passageway 26 which allows fluid to enter the passageway 190, such as by flowing between a gap in the facing ends of the input shaft 40 and output shafts 16 and 18. The fluid passageway 190 extends through an aperture 106 in the driving plate 104 of the second clutch arrangement 30 to permit fluid to flow to the first clutch arrangement 20. The driving plates 102 and 104 may include fluid passages proximate the driving discs 24 and 34 to allow for the fluid to flow thereto.

The provision of separate fluid passages 188 and 190, and their associated fluid flow passages in the fluid paths, for the first and second clutch arrangements 20 and 30 can beneficially provide for improved fluid flow by permitting separate control of the fluid flow rates of cooling and/or lubricating fluid to the clutch arrangements 20 and 30. In particular, separately controllable fluid flow rates for the clutch arrangements 20 and 30, as compared to having common fluid passages, can permit the fluid flow rate to one of the clutch arrangements 20 and 30 to be decreased prior to the discs 22 and 24 or 32 and 34 being engaged in order to reduce clutch drag due to fluid without a corresponding decrease in the fluid flow rate to the other one of the clutch arrangements 22 and 30.

The dual clutch mechanism 10 can include an outer housing 50 and an inner housing 12 disposed. The outer housing 50 may be disposed around the first and second clutch arrangements 20 and 30 and can be independently rotatable relative to the input and output shafts 40, 18 and 16. A sealing member 56 is positioned between the input shaft 40, proximate the input flange 42, and the outer housing 50 in order to allow for relative rotation between the input shaft 40 and the outer housing 50 while minimizing the amount of fluid that can pass between the sealing member 56 and the input shaft 40.

The inner housing 12 may also be rotatably independent relative to the input and output shafts 40, 18 and 16. The intermediate housing 12 may include a portion that defines a section of a fluid supply path for supplying fluid to each of the first and second clutch arrangements 20 and 30 via the passage 62 and the fluid distribution sleeve 60, clutch hub 86, and clutch support 70.

Gears (not shown) are mounted on the output shafts 16 and 18. The gears alternate between the output shafts 16 and 18, such that the effective gear ratios increase sequentially between the shafts. For example, the gear associated with first gear may be mounted on the inner output shaft 16, the gear associated with second gear may be mounted on the outer output shaft 18, the gear associated with third gear may be mounted on the inner output shaft 16, the gear associated with fourth gear may be mounted on the outer output shaft 18, and, if present, the gear associated with fifth gear may be mounted on the inner output shaft 16 and the gear associated with sixth gear may be mounted on the outer output shaft 18.

Each of the gears on the output shafts 16 and 18 can be selectively engaged for rotation therewith by a gear selector, such as a one way clutch (for first gear) or a synchronizer (for higher gears). By alternating between the first and second clutch arrangements 20 and 30, the effective gear ration can be selectively changed depending upon which of the inner and outer output shafts 16 and 18 are engaged to be driven for rotation by the input shaft 40 and which of the gears is engaged for rotation with the output shafts 16 and 18. A layshaft having gears thereon may be positioned intermediate of the output shafts 16 and 18, such that the effective gear ratio includes the ratio between the gear on the engaged output shaft 16 or 18 and the corresponding gear on the layshaft.

Shifting between sequential effective gear ratios (i.e., first to second, fourth to fifth, third to second, etc.) is accomplished by alternating which of the clutch arrangements 20 and 30 is engaged to permit the input shaft 40 to drive the associated output shafts 16 and 18. When one gear ratio is selected, the output shaft having the associated gear thereon is driven for rotation by the input shaft by virtue of engagement of the driving and driven discs associated with the output shaft. The other output shaft is not driven for rotation, and the driving and driven discs associated with that output shaft are unengaged. Thus, torque is transmitted from the input shaft through only one of the sets of driving and driven discs and to the associated output shaft.

To shift to another effective gear ratio, either higher or lower, the next gear associated with the next ratio on the other of the output shafts is coupled to that output shaft such that the engaged gear on the output shaft associated with the engaged one of the sets of driving and driven discs drives, either directly or indirectly, the next gear for rotation. However, at this time the set of driving and driven discs associated with the output shaft having the next gear thereon remain unengaged. In this manner, the engaged gear on the output shaft associated with the engaged one of the sets of driving and driven discs drives the next gear and its associated output shaft for rotation, thereby either accelerating or decelerating the output shaft and its respective gear, as well as the unengaged driving discs, up to or down to the same rotational speed as their associated output shaft. Once the unengaged shaft and driving discs are brought to the desired speed, the engaged discs are unengaged and the unengaged discs are engaged so that the input shaft now drives the output shaft with the newly-engaged discs and at a rotational speed determined in part by its respective gear ratio.

During the acceleration of the unengaged driving discs, the cooling and/or lubricating fluid flow rate to those discs can beneficially be reduced in order to reduce clutch drag, and in particular clutch drag due to fluid between unengaged driving and driven discs. Clutch drag, $D_{clutch}$, is a function of several factors relating to the construction of the dual clutch mechanism construction and materials, oil flow, clutch operating conditions, and other such factors. The relationship between clutch rotational speed and clutch drag can be expressed as $D_{clutch} = f(\omega_{clutch}, q)$, where $\omega_{clutch}$ is the rotational speed of the clutch and q is the oil flow rate. Given this relationship, a reduction of the oil flow rate (q) to the unengaged ones of the discs can result in a decrease in the clutch drag $D_{clutch}$ during the process of accelerating the driving discs of the unengaged clutch. At the same time of bringing the discs 22 and 24 or 32 and 34 into frictional engagement, the separate flow paths permits for a flow rate to the engaged set of the discs 22 and 24 or 32 and 34 that is not substantially modified, not modified at all, or not modified to the same extent as the flow rate to the engaged set of the discs 22 and 24 or 32 and 34, as may be required for the efficient operation of the system.

A fluid control system (not shown) is provided to control the selective engagement of the first and second clutch arrangements 20 and 30. More specifically, a fluid control system is provided that includes multiple fluid flow passages each having an electronically, fluid, or pneumatically operated valve or other such restrictor for fluid control to permit fluid flow therethrough. A pump drive 128 may be driven for rotation to supply pressurized operating fluid for the fluid control system. The pump drive 128 may be driven by an extension 14 attached to the common driven plate 198. The fluid control system is used to selectively provide pressurized fluid to the pressure apply chambers 164 and 182 of each of the clutch arrangements 20 and 30, the balance chambers 134 and 180 on the opposite side of each of the pistons 138 and 168, and via the pair of fluid passages 190 and 188 to the plate clutch arrangements 20 and 30 for cooling and/or lubrication thereof, as will be discussed in greater detail herein.

The control system permits control of the fluid flow rates through the fluid passages to either the first and second pressure apply chambers 164 and 182 to selectively shift the pressure apply pistons 138 and 168 from their unapplied positions to their applied positions to selectively engage the driving and driven discs 22 and 24 or 32 and 34 of the respective clutch arrangements 20 and 30 to cause either the inner or outer output shaft 16 or 18 to be driven for rotation via the input shaft 40. The control system also permits the flow rate to the unengaged set of the driving and driven discs 22 and 24 or 32 and 34 to be decreased without a corresponding decrease in the flow rate of fluid to the engaged set of the driving and driven discs 22 and 24 or 32 and 34. The reduction in flow rate of fluid to the unengaged driving and driven discs 22 and 24 or 32 and 34 can reduce the clutch drag on the output shaft 16 or 18 associated with the set of unengaged driving and driven discs 22 and 24 or 32 and 34 by reduced fluid flow therepast.

In operation, the input flange 42 is driven to rotate the connected input shaft 40. Rotation of the input shaft 40 causes rotation of the clutch hub 86 via the clutch hub support member 84, which causes the common driven plate 198 to rotate, along with the driven clutch plates 24 and 34 attached thereto.

In order to cause the input shaft 40 to drive the outer output shaft 18 for rotation, the first clutch arrangement 20 is engaged and the second clutch arrangement 30 is unengaged. More specifically, the fluid pressure in the pressure apply chamber 164 is increased over the fluid pressure in the balance chamber 134 and the spring 60 bias force a sufficient amount to cause the piston 138 to shift from its unapplied position to its applied position where, in the applied position, the piston 138 frictionally compresses the driven clutch discs 22 with the driving clutch discs 24. In order to increase the pressure in the pressure apply chamber 164 of the first clutch arrangement 20, the fluid control system is used to supply fluid at an increased flow rate to the pressure apply chamber 164 via the passageway 64 in the distribution sleeve 60 and the aligned passage 94 in the clutch support 70. The flow rate of fluid to the pressure apply chamber 182 of the second clutch arrangement 30 is decreased a sufficient amount to permit the fluid pressure in the balance chamber 180 and/or the spring 160 force to urge the piston 168 from its applied position to its unapplied position where it is no longer frictionally compressing the discs 32 and 34 of the second clutch arrangement 30.

Prior to frictionally compressing the driven clutch discs 22 with the driving clutch discs 24, the flow rate of cooling and/or lubrication fluid to the discs 22 and 24 is decreased in order to reduce clutch drag during acceleration of the driving discs 24 relative to the driven discs 22, as discussed in greater detail above. This reduction in flow rate is accomplished by using the fluid control system to reduce, or even shut off, fluid flow to the discs 22 and 24 of the first clutch arrangement 20 through the interconnected open passageway 26 of the distribution sleeve 60, the passageway 190 and the aperture 106 in the driving plate 104 of the second clutch arrangement 30. At the same time, the flow rate of cooling and/or lubrication fluid to the engaged discs 32 and 34 of the second clutch arrangement 30 can be maintained or not reduced by the same amount as the flow rate of cooling and/or lubrication fluid to the unengaged discs 22 and 24 of the first clutch arrangement 20.

In order to cause the input shaft 40 to drive the inner output shaft 16 for rotation, the second clutch arrangement 30 is engaged and the first clutch arrangement 20 is unengaged. More specifically, the fluid pressure in the pressure apply chamber 182 is increased over the fluid pressure in the balance chamber 180 and the spring 160 bias force a sufficient amount to cause the piston 168 to shift from its unapplied position to its applied position where, in the applied position, the piston 168 frictionally compresses the driven clutch discs 32 with the driving clutch discs 34. In order to increase the pressure in the pressure apply chamber 182 of the second clutch arrangement 30, the fluid control system is used to supply fluid at an increased flow rate to the pressure apply chamber 182 via the passageway 58 in the distribution sleeve 60 and the aligned passage 88 in the clutch support 70. The flow rate of fluid to the pressure apply chamber 164 of the first clutch arrangement 20 is decreased a sufficient amount to permit the fluid pressure in the balance chamber 134 and/or the spring 60 force to urge the piston 138 from its applied position to its unapplied position where it is no longer frictionally compressing the discs 22 and 24 of the first clutch arrangement 20.

Prior to frictionally compressing the driven clutch discs 32 with the driving clutch discs 34 of the second clutch arrangement 30, the flow rate of cooling and/or lubrication fluid to the discs 32 and 34 is decreased in order to reduce clutch drag during acceleration of the driving discs 34 relative to the driven discs 32, as discussed in greater detail above. This reduction in flow rate is accomplished by using the fluid control system to reduce, or even shut off, fluid flow to the discs 32 and 34 of the second clutch arrangement 30 through the interconnected passageway 36 of the distribution sleeve 60, the passageway 38 of the clutch support 70, the passageway 188 and the aperture 170 in the piston 168 of the second clutch arrangement 30. At the same time, the flow rate of cooling and/or lubrication fluid to the engaged discs 22 and 24 of the first clutch arrangement 20 can be maintained or not reduced by the same amount as the flow rate of cooling and/or lubrication fluid to the unengaged discs 32 and 34 of the second clutch arrangement 30.

Spacing the input shaft 40 axially from the output shafts 16 and 18 can reduce the overall diameter of the dual clutch mechanism 10 without a significant (if any) loss in the clutch's operating efficiency as compared to a dual clutch mechanism having concentric input and output shafts and provide multiple benefits. The reduced, combined radial space required for the input 40 and concentric inner and outer output shafts 18 and 16 can permit the use of the dual clutch mechanism 10 in applications where other dual clutch systems could not be used, or have been used by compromising the design of other aspects of the overall drive system. Axially spacing the input shaft 40 from the output shafts 16 and 18 can allow for an increased diameter of the output shafts 16 and 18 without necessitating a corresponding significant increase in the radial dimensions of the dual clutch mechanism 10. The increased diameter of the two concentric output shafts 16 and 18 can result in an increase in the torsional stiffness of the shafts 16 and 18, and, in some applications, also permits a reduction in the length of the shafts 16 and 18. This can provide improvements in the operating characteristics of the dual clutch mechanism 10 and further space savings. The diameter of the input shaft 40 also may be increased, and, in some applications, the input shaft 40 length reduced to further minimizing the total space required for the dual clutch mechanism 10.

Axially spacing the input shaft 40 from the output shafts 16 and 18 can also allow for a reduction in the diameter and size of the clutch hub or clutch support. Such a reduction provides additional space savings and, in some instances reduces the size and cost of sealing rings necessary to seal between the clutch hub or support and the outer output shaft or an intermediate fluid distribution sleeve. The reduction in the overall radial dimensions of the dual clutch mechanism also can allow for a decrease in the diameter of the clutch apply pistons 138 and 168 while maintaining a comparable operating efficiency. In addition, a reduction in the radial dimension of the dual clutch mechanism 10 can further can reduce the effects of centrifugal forces on the clutch apply pistons 138 and 168 and the required force necessary to shift the pistons 138 and 168 from their unapplied positions to their applied positions.

In another embodiment, a dual clutch mechanism 210, as illustrated in FIG. 2, includes an input shaft 240 which is operably connected to drive a driven side of first and second clutch arrangements 220 and 230 via a torsional vibration damper, as will be explained in greater detail below.

An outer output shaft 216 is operably connected to a driving side of the first clutch arrangement 220, and an inner output shaft 218 is operably connected to a driving side of the second clutch arrangement 230. The first clutch arrangement 220 is selectively operable to allow its driven side to drive its driving side, thereby driving the outer output shaft 216. The second clutch arrangement 230 is also selectively operable to allow its driven side to drive its driving side, thereby driving the inner output shaft 218. The input shaft 240 is axially spaced from the outer output shaft 216 but is concentric with the inner output shaft 218. This permits the dual clutch mechanism 210 to achieve some of the benefits of a reduced radial dimension discussed above with respect to the dual clutch mechanism 10 of FIG. 1, in particular as compared to a dual clutch mechanism having concentric input and output shafts.

The first and second clutch arrangements 220 and 230 are each formed of a plurality of intermeshing clutch discs. The first clutch arrangement 220 has a set of annular clutch discs 224 attached to a common driven plate 398, while an intermeshing set of annular clutch discs 222 are attached to a first driving plate 302. A piston 338 is selectively shifted from an unengaged position to an engaged position whereby the piston frictionally compresses the clutch discs 222 and 224 together to permit the common driven plate 398 to drive the first driving plate 302. Likewise, the second clutch arrangement 230 has a set of annular clutch discs 234 attached to the same common drive plate 398, while an intermeshing set of annular clutch discs 232 are attached to a second driving plate 304. A piston 340 is selectively shifted from an unengaged position to an engaged position whereby the piston compresses the clutch plates 232 and 234 together to permit the driven plate 300 to drive the second driving plate 304.

In order to reduce the rotational inertia on the output side of the dual clutch mechanism 210, the first driving plate 302 is associated with the inner diameters of the driving discs 222 of the first clutch arrangement 220 and the second driving plate 304 is associated with the inner diameters of the driving discs 232 of the second clutch arrangement 230. As discussed above with respect to the dual clutch mechanism 10 of FIG. 1, such an arrangement can reduce both the radial position of the center of gravity of the first and second driving plates 302 and 304 and the mass of the plates 302 and 304.

The piston 338 of the first plate clutch arrangement 220 separates a pressure apply chamber 364 from a balance or compensation chamber 334. A plurality of springs 360 are positioned in the balance chamber 334 and biases the piston 338 from its engaged position, whereby the intermeshing clutch discs 222 and 224 are pressed into frictional engagement with each other, to its unengaged position. Similarly, the piston 340 of the second plate clutch arrangement 230 separates a pressure apply chamber 382 from a pressure compensation chamber 380. Positioned within the pressure compensation chamber 380 are a plurality of springs 360 each placed in a spring carrier 362.

The piston 338 of the first plate clutch arrangement 220 is shifted from its unengaged position to its engaged position when the pressure in the apply chamber 364 is greater than the pressure in the balance chamber 336 and the biasing force of the springs 360. The piston 340 of the second plate clutch arrangement 230 is shifted from its unengaged position to its engaged position when the pressure in the apply chamber 382 is greater than the pressure in the balance chamber 380 and the biasing force of the springs 360.

Operating fluid is supplied to the first and second plate clutch arrangements 220 and 230 via a network of fluid passages. Fluid enters a passage 262 which leads to a fluid distribution sleeve 260. The fluid distribution sleeve 260 is concentrically disposed around the input shaft 240, and has a plurality of grooves 268, 258, 288, 264 and 266 formed therein. The grooves 268, 258, 288, 264 and 266 of the fluid distribution sleeve 260 are each aligned with a fluid passage 276, 278, 236, 272 and 274 formed in a clutch support 270 which is concentrically disposed around the fluid distribution sleeve 260. The fluid passages 276, 278, 236, 272 and 274 of the clutch support 270 are aligned with fluid passages 290, 288, 388, 294 and 292 of a clutch hub 286, concentrically disposed around the clutch support 270. The fluid passages of the fluid distribution sleeve 260, clutch support 270, and clutch hub 286 are aligned to define separate fluid paths to the pressure apply chamber 364 and balance chamber 334 of the first clutch arrangement 220, to the first clutch arrangement 220, as will be discussed in greater detail herein, and to the pressure apply chamber 382 and balance chamber 380 of the second clutch arrangement 230. A plurality of seals are positioned between the clutch hub 286 and the clutch support sleeve 270 to provide sealing therebetween while permitting relative rotation.

Separately control of the fluid flow rates for the cooling and/or lubricating fluid are provided for each of the first and second clutch arrangements 220 and 230 in order to permit the clutch drag to be reduced, as discussed above with respect to the dual clutch mechanism 10 of FIG. 1. The fluid path to the clutch discs 222 and 224 of the first clutch arrangement 220 includes aligned passages 388, 236 and 238. A portion of the passage 388 is defined in part by a portion of the common driven plate 398 and the housing member 392. A portion of the passage 388 extends through an aperture 306 in the apply piston 360 of the first clutch arrangement 220. The fluid path to the clutch discs 232 and 234 of the second clutch arrangement 230 includes the fluid passage 302, which is supplied with fluid via an opening 362 in an end of the fluid distribution sleeve 260. A portion of the fluid passage 302 extends through an aperture 370 in the driving plate 304 of the first clutch arrangement 302 to permit fluid to flow to the clutch discs 32 and 34 of the second clutch arrangement 230, as illustrated in FIG. 2. The opening 362 in the end of the fluid distribution sleeve 260 is also used to supply fluid to the passages 274 and 292 which provide fluid to the first clutch balance chamber 334. Accordingly, the fluid supplies to the first clutch balance chamber 334 and the second clutch arrangement 230 are not separately controllable.

A dampening mechanism may be positioned between the input shaft 240 and the common driven plate 398 to absorb vibrations. The dampening mechanism includes an outer plate 352 connected to an inner plate 322 via a resilient member 320. The outer plate 352 is driven for rotation by the input shaft 240, and the inner plate 322 drives a generally axially extending portion 324 of the common driven plate 398 for rotation. The axially extending portion 324 has a gap 346 to permit the depending portion 342 of the apply piston 340 to operate therethrough. In operation, an input flange 142 is driven to rotate the connected input shaft 240. Rotation of the input shaft 240 causes rotation of the outer plate 352 and the connected to inner plate 322 via the resilient member 320. The inner plate 322 in turn drives the generally axially extending portion 324 of the common driven plate 398 for rotation, along with the driven plates 224 and 234 associated therewith.

Turning now to the operation of the dual clutch mechanism 210, the first clutch arrangement 220 is engaged and the second clutch arrangement 230 is unengaged in order to cause the input shaft 240 to drive the outer output shaft 216 for rotation. More specifically, the fluid pressure in the pressure apply chamber 364 is increased over the fluid pressure in the balance chamber 334 and the spring 360 bias force a sufficient amount to cause the piston 338 to shift from its unapplied position to its applied position where, in the applied position, the piston 338 frictionally compresses the driven clutch discs 322 with the driving clutch discs 324.

In order to increase the pressure in the pressure apply chamber 364 of the first clutch arrangement 220, a fluid control system, similar to that discussed above with respect to the dual clutch mechanism 10 of FIG. 1, is used to supply fluid at an increased flow rate to the pressure apply chamber 364 via the passageway 264 in the distribution sleeve 260, the aligned passage 272 in the clutch support 270 and the aligned passage 294 in the clutch hub 286. The flow rate of fluid to the pressure apply chamber 362 of the second clutch arrangement 230 is decreased a sufficient amount to permit the fluid pressure in the balance chamber 380 and/or the spring 360 force to urge the piston 340 from its applied position to its unapplied position where it is no longer frictionally compressing the discs 232 and 234 of the second clutch arrangement 230.

Prior to frictionally compressing the driven clutch discs 222 with the driving clutch discs 224, the flow rate of cooling and/or lubrication fluid to the discs 222 and 224 is decreased in order to reduce clutch drag during acceleration of the driving discs 224 relative to the driven discs 222, as discussed in greater detail above. This reduction in flow rate is accomplished by using the fluid control system to reduce, or even shut off, fluid flow to the discs 222 and 224 of the first clutch arrangement 220 through the passageway 238 of the distribution sleeve 260, the passageway 236 of the clutch support 270, the passageway 388 and the aperture 306 in the piston 338 of the first clutch arrangement 220. At the same time, the flow rate of cooling and/or lubrication fluid to the engaged discs 232 and 234 of the second clutch arrangement 230 can be maintained or modified as necessary according to the requirements of the system.

Conversely, in order to cause the input shaft 240 to drive the inner output shaft 218 for rotation, the second clutch arrangement 230 is engaged and the first clutch arrangement 220 is unengaged. The fluid pressure in the pressure apply chamber 362 of the second clutch arrangement 230 is increased over the fluid pressure in the balance chamber 380 and the spring 360 bias force a sufficient amount to cause the piston 340 to shift from its unapplied position to its applied position where, in the applied position, the piston 340 frictionally compresses the driven clutch discs 232 with the driving clutch discs 234.

In order to increase the pressure in the pressure apply chamber 362 of the second clutch arrangement 230, the fluid control system is used to supply fluid at an increased flow rate to the pressure apply chamber 362 via the passageway 258 in the distribution sleeve 260, the aligned passage 278 in the clutch support 70 and the aligned passage 288 in the clutch hub 286. The flow rate of fluid to the pressure apply chamber 364 of the first clutch arrangement 220 is decreased a sufficient amount to permit the fluid pressure in the balance chamber 334 and/or the spring 360 force to urge the piston 338 from its applied position to its unapplied position where it is no longer frictionally compressing the discs 322 and 324 of the first clutch arrangement 220.

Prior to frictionally compressing the driven clutch discs 232 with the driving clutch discs 234 of the second clutch arrangement 230, the flow rate of cooling and/or lubrication fluid to the discs 232 and 234 is decreased in order to reduce clutch drag during acceleration of the driving discs 234 relative to the driven discs 232, as discussed in greater detail above. This reduction in flow rate is accomplished by using the fluid control system to reduce, or even shut off, fluid flow to the discs 232 and 234 of the second clutch arrangement 230 through the interconnected open passageway 266 of the distribution sleeve 60, the passageway 390 and the aperture 370 in the driving plate 302 of the first clutch arrangement 220. At the same time, the flow rate of cooling and/or lubrication fluid to the engaged discs 222 and 224 of the first clutch arrangement 220 can be maintained or modified to a different degree.

While the invention has been described by reference to certain specific descriptive examples which illustrate preferred materials and conditions, it is understood that the invention is not limited thereto. Rather all alternatives, modifications and equivalents within the scope of the invention so described are considered to be within the scope of the appended claims.

The invention claimed is:

1. A dual clutch mechanism comprising:
an input shaft, a first output shaft and a second output shaft, the second output shaft having a portion disposed within the first output shaft, the input shaft being axially spaced a distance from the first output shaft and the second output shaft such that there is no portion of either of the first output shaft or the second output shaft overlapping the input shaft radially therefrom;
a first clutch having a first clutch driven side with a set of first clutch driven discs and a first clutch driving side with a set of first clutch driving discs, the first clutch driven side being rotatably drivable by the input shaft via a common driven plate and the first output shaft being selectively rotatably drivable by the first clutch driving side via a first clutch driving plate when the first clutch driven and driving discs are engaged; wherein the first output shaft is associated with an inner diameter of the first clutch driving discs to reduce rotational inertia on the driving side of the first clutch arrangement; and
a second clutch having a second clutch driven side with a set of second clutch driven discs and a second clutch driving side and a set of second clutch driving discs, the second clutch driven side being rotatably drivable by the input shaft via the common driven plate and the second output shaft being selectively rotatably drivable by the second clutch driving side via a second clutch driving plate when the second clutch driven and driving discs are engaged, the second output shaft being associated with an inner diameter of the second clutch driving discs to reduce rotational inertia on the driving side of the second clutch arrangement, the common driven plate having a segment being disposed radially outward relative to the first and second clutch driving plates; and
a first clutch fluid path for supplying fluid to the discs of the first clutch and a second clutch fluid path for supplying fluid to the discs of the second clutch, the first and second clutch fluid paths being independent.

2. A dual clutch mechanism in accordance with claim 1, wherein:
a first clutch apply piston selectively shiftable between an applied and an unapplied position, the first clutch apply piston in the applied position compressing the driving and driven discs of first clutch into engagement to drive the first output shaft for rotation via the input shaft;
a second clutch apply piston selectively shiftable between an applied and an unapplied position, the second clutch apply piston in the applied position compressing the driving and driven discs of second clutch into engagement to drive the second output shaft for rotation via the input shaft;
the first clutch fluid path extends through one of an opening in the second clutch driving plate and an opening in the first clutch apply piston; and
the second clutch fluid path extends through one of an opening in the second clutch apply piston and an opening in the first clutch driving plate.

3. A dual clutch mechanism in accordance with claim 2, wherein one of the first and second clutch apply pistons includes a segment radially outward from the driving and driven discs of the first and second clutches and a segment passing through an opening in the common driven plate.

4. A dual clutch mechanism in accordance with claim 3, wherein:
a first clutch pressure apply chamber and a first clutch balance chamber of the first clutch separated by the first clutch apply piston, the first clutch apply piston being shiftable from the unapplied portion to the applied position when sufficient fluid pressure is present in the first clutch pressure apply chamber;
a second clutch pressure apply chamber and a second clutch balance chamber of the second clutch separated by the second clutch apply piston, the second clutch apply piston being shiftable from the unapplied portion to the applied position when sufficient fluid pressure is present in the second clutch pressure apply chamber.

5. A dual clutch mechanism in accordance with claim 4, wherein the first and second clutch balance chambers are each positioned axially outward from the first and second clutch pressure apply chambers.

6. A dual clutch mechanism in accordance with claim 4, wherein the first clutch and second pressure apply chamber fluid paths, the first and second clutch fluid paths, and the first and second clutch balance chamber fluid paths are each independent.

7. A dual clutch mechanism in accordance with claim 4, wherein the first and second clutch pressure apply chamber fluid paths, the first and second clutch fluid paths, and one of the first and second clutch balance chamber fluid paths are each independent.

8. A dual clutch mechanism in accordance with claim 7, wherein:
the common driven plate is driven for rotation by the input shaft via an intermediate outer plate and not through a hub at least partially surrounding the inner and outer output shafts and coaxial therewith;
the hub having separate hub fluid passages therethrough.

9. The dual clutch mechanism of claim 1 wherein the input shaft and the two output shafts are not in direct contact with each other.

10. A dual clutch mechanism for an automotive transmission, the dual clutch mechanism comprising:
an input shaft adapted for rotation about a longitudinally extending axis;
a hollow outer output shaft being coaxial with the input shaft;
an inner output shaft positioned within the outer output shaft and adapted for rotation independent thereof and being coaxial with the axis of the input shaft, the input shaft being axially spaced a distance from the first output shaft and the second output shaft such that there is no portion of either of the first output shaft or the second output shaft overlapping the input shaft radially therefrom;
a first clutch arrangement having a plurality of intermeshing driven clutch discs and driving clutch discs;
a first clutch driving plate operably connected to the first driving clutch discs and the outer output shaft;
wherein the outer output shaft and first clutch driving plate are associated with an inner diameter of the first clutch driving discs to reduce the radial position of the center of gravity of the outer output shaft and first clutch driving plate on the driving side of the first clutch arrangement;
a second clutch arrangement axially spaced from the first clutch arrangement, the second clutch arrangement having a plurality of intermeshing driven clutch discs and driving clutch discs;
a second clutch driving plate operably connected to the second driving clutch discs and the inner output shaft;
wherein the inner output shaft and second clutch driving plate are associated with an inner diameter of the first clutch driving discs to reduce the radial position of the center of gravity of the inner output shaft and second clutch driving plate on the driving side of the second clutch arrangement;
a common driven plate operably connected to the driven discs of the first and second clutch arrangements and the input shaft, an interface between the common driven plate and the first and second clutch driven discs being disposed radially outward relative to the driving plates of the first clutch and second clutch arrangements;
a first clutch pressure apply chamber being adjacent to a first clutch apply piston and a second clutch pressure apply chamber being adjacent to a second clutch apply piston, the first and second apply pistons each having an apply position where the piston is arranged to frictionally engage the respective driven set of clutch discs operably connected to the common driven plate and the driving set of clutch discs operably connected to the clutch driving plate to drive the clutch driving plate for rotation with the common driven plate when sufficient pressure is applied in the pressure apply chamber and an unapplied position where the piston is not arranged to frictionally engage the driven and driving set of clutch discs so the clutch driving plate is not driven for rotation with the common driven plate; and
a first clutch balance chamber and a second clutch balance chamber, the balance chambers each being separated from the respective pressure apply chamber by the respective apply piston.

11. A dual clutch mechanism in accordance with claim 10, wherein: the apply piston for one of the first and second clutch arrangements includes a segment radially outward from the discs of the one of the first and second clutch arrangements.

12. A dual clutch mechanism for an automotive transmission in accordance with claim 11, wherein:
the pressure apply chamber for the one of the first and second clutch arrangements is at least partially defined between the associated apply piston and the portion of the common driven plate disposed radially inward from the driven and driving discs of the one of the first and second clutch arrangements; and the pressure apply chamber for the other of the first and second clutch arrangements is at least partially defined between the associated apply piston and a housing plate.

13. A dual clutch mechanism for an automotive transmission in accordance with claim 12, wherein the first and second pressure apply chambers are each disposed between the first and second balance chambers.

14. A method of selectively engaging one of a first output shaft and a second output shaft to be driven for rotation via an input shaft of a dual clutch mechanism, the input shaft being axially spaced a distance from the first output shaft and the second output shaft such that there is no portion of either of the first output shaft or the second output shaft overlapping the input shaft radially therefrom, the method comprising:

providing a first clutch arrangement having a set of annular driven discs having outer diameters associated with a common driven plate and an intermeshed set of driving discs having inner diameters associated with a first driving plate to reduce the radial position of the center of gravity of the first driving plate on the driving side of the first clutch arrangement, the first driving plate being operably connected to the first output shaft to drive the first output shaft for rotation therewith when a first clutch apply piston compresses the driven discs with the intermeshed driving discs to engage the discs of the first clutch due to fluid pressure in a first clutch pressure apply chamber; and providing a second clutch arrangement having a set of annular driven discs having outer diameters associated with the common driven plate and an intermeshed set of driving discs having inner diameters associated with a second driving plate to reduce the radial position of the center of gravity of the second driving plate on the driving side of the second clutch arrangement, the second driving plate being operably connected to the second output shaft to drive the second output shaft for rotation therewith when a second clutch apply piston compresses the driven discs with the intermeshed driving discs to engage the discs of the second clutch due to fluid pressure in a second clutch pressure apply chamber.

15. A method in accordance with claim 14, including:
positioning an axial segment of one of the first and second clutch apply pistons radially outward relative to a segment of the common driven plate; and
extending a radial segment of the one of the first and second clutch apply pistons through an opening on the segment of the common driven plate.

16. A method in accordance with claim 15, including:
providing a first clutch balance chamber on an opposite side of the first clutch apply piston from the first clutch pressure apply chamber;
providing a second clutch balance chamber on an opposite side of the second clutch apply piston from the second clutch pressure apply chamber; and
providing the first and second clutch pressure apply chambers each disposed between the first and second balance chambers.

17. A dual clutch mechanism comprising:
an input shaft, a first output shaft and a second output shaft, the second output shaft being coaxial with the first output shaft, the input shaft being axially spaced a distance from the first output shaft and the second output shaft such that there is no portion of either of the first output shaft or the second output shaft overlapping the input shaft radially therefrom;

a first clutch having a first clutch driven side with a set of first clutch driven discs and a first clutch driving side with a set of first clutch driving discs, the first clutch driven side being rotatably drivable by the input shaft via a common driven plate and the first output shaft being selectively rotatably drivable by the first clutch driving side via a first clutch driving plate when the first clutch driven and driving discs are engaged; and a second clutch having a second clutch driven side with a set of second clutch driven discs and a second clutch driving side and a set of second clutch driving discs, the second clutch driven side being rotatably drivable by the input shaft via the common driven plate and the second output shaft being selectively rotatably drivable by the second clutch driving side via a second clutch driving plate when the second clutch driven and driving discs are engaged, the common driven plate having a segment being disposed radially outward relative to the first and second clutch driving plates; and a first clutch fluid path for supplying fluid to the discs of the first clutch and a second clutch fluid path for supplying fluid to the discs of the second clutch, the first and second clutch fluid paths being independent wherein the input shaft and output shaft are only drivingly connected to each other through first and second clutches.

18. A dual clutch mechanism comprising:
an input shaft, a first output shaft and a second output shaft, the second output shaft being coaxial with the first output shaft and wherein at least a portion of second shaft overlaps a portion of the first shaft;

a first clutch having a first clutch driven side with a set of first clutch driven discs and a first clutch driving side with a set of first clutch driving discs, the first clutch driven side being rotatably drivable by the input shaft via a common driven plate and the first output shaft being selectively rotatably drivable exclusively by the first clutch driving side via a first clutch driving plate when the first clutch driven and driving discs are engaged; and a second clutch having a second clutch driven side with a set of second clutch driven discs and a second clutch driving side and a set of second clutch driving discs, the second clutch driven side being rotatably drivable by the input shaft via the common driven plate and the second output shaft being selectively rotatably drivable exclusively by the second clutch driving side via a second clutch driving plate when the second clutch driven and driving discs are engaged, the common driven plate having a segment being disposed radially outward relative to the first and second clutch driving plates; and a first clutch fluid path for supplying fluid to the discs of the first clutch and a second clutch fluid path for supplying fluid to the discs of the second clutch, the first clutch fluid path and the second clutch fluid path being connected to a common fluid inlet passage, the first clutch fluid path being constructed and arranged to selectively permit and restrict or shut off fluid flow there through independent of the second clutch fluid path and second clutch fluid path being constructed and arranged to selectively permit and restrict or shut off fluid flow there through independent of the first clutch fluid path.

19. A dual clutch mechanism comprising:
an input shaft, a first output shaft and a second output shaft, the second output shaft having a portion disposed within the first output shaft;

a first clutch having a first clutch driven side with a set of first clutch driven discs and a first clutch driving side with a set of first clutch driving discs, the first clutch driven side being rotatably drivable by the input shaft via a common driven plate and the first output shaft being selectively rotatably drivable by the first clutch driving side via a first clutch driving plate when the first clutch driven and driving discs are engaged; wherein the first output shaft is associated with an inner diameter of the first clutch driving discs to reduce rotational inertia on the driving side of the first clutch arrangement; and a second clutch having a second clutch driven side with a set of second clutch driven discs and a second clutch driving side and a set of second clutch driving discs, the second clutch driven side being rotatably drivable by the input shaft via the common driven plate and the second output shaft being selectively rotatably drivable by the second clutch driving side via a second clutch driving plate when the second clutch driven and driving discs are engaged, the second output shaft being associated with an inner diameter of the second clutch driving discs to reduce rotational inertia on the driving side of the second clutch arrangement, the common driven plate having a segment being disposed radially outward relative to the first and second clutch driving plates; and a first clutch fluid path for supplying fluid to the discs of the first clutch and a second clutch fluid path for supplying fluid to the discs of the second clutch, first clutch fluid path and the second clutch fluid path being connected to a common fluid inlet passage, the first clutch fluid path being constructed and arranged to selectively permit and restrict or shut off fluid flow there through independent of the second clutch fluid path and second clutch fluid path being constructed and arranged to selectively permit and restrict or shut off fluid flow there through independent of the first clutch fluid path.

20. A dual clutch mechanism for an automotive transmission, the dual clutch mechanism comprising:

an input shaft adapted for rotation about a longitudinally extending axis;

a hollow outer output shaft being coaxial with the input shaft;

an inner output shaft positioned within the outer output shaft and adapted for rotation independent thereof and being coaxial with the axis of the input shaft;

a first clutch arrangement having a plurality of intermeshing driven clutch discs and driving clutch discs;

a first clutch driving plate operably connected to the first driving clutch discs and the outer output shaft;

wherein the outer output shaft and first clutch driving plate are associated with an inner diameter of the first clutch driving discs to reduce the radial position of the center of gravity of the outer output shaft and first clutch driving plate on the driving side of the first clutch arrangement;

a second clutch arrangement axially spaced from the first clutch arrangement, the second clutch arrangement having a plurality of intermeshing driven clutch discs and driving clutch discs;

a second clutch driving plate operably connected to the second driving clutch discs and the inner output shaft;

wherein the inner output shaft and second clutch driving plate are associated with an inner diameter of the second clutch driving discs to reduce the radial position of the center of gravity of the inner output shaft and second clutch driving plate on the driving side of the second clutch arrangement;

a common driven plate operably connected to the driven discs of the first and second clutch arrangements and the input shaft, an interface between the common driven plate and the first and second clutch driven discs being disposed radially outward relative to the driving plates of the first clutch and second clutch arrangements;

a first clutch fluid path for supplying fluid to the first clutch arrangement and a second clutch fluid path for supplying fluid to the second clutch arrangement, the first clutch fluid path and the second clutch fluid path being connected to a common fluid inlet passage, the first clutch fluid path being constructed and arranged to selectively permit and restrict or shut off fluid flow there through independent of the second clutch fluid path and second clutch fluid path being constructed and arranged to selectively permit and restrict or shut off fluid flow there through independent of the first clutch fluid path.

21. A method comprising:

providing a dual clutch mechanism for an automotive transmission, the dual clutch mechanism comprising:

an input shaft adapted for rotation about a longitudinally extending axis;

a hollow outer output shaft being coaxial with the input shaft;

an inner output shaft positioned within the outer output shaft and adapted for rotation independent thereof and being coaxial with the axis of the input shaft, the input shaft being axially spaced a distance from the first output shaft and the second output shaft such that there is no portion of either of the first output shaft or the second output shaft overlapping the input shaft radially therefrom;

a first clutch arrangement having a plurality of intermeshing driven clutch discs and driving clutch discs;

a first clutch driving plate operably connected to the first driving clutch discs and the outer output shaft;

wherein the outer output shaft and first clutch driving plate are associated with an inner diameter of the first clutch driving discs to reduce the radial position of the center of gravity of the outer output shaft and first clutch driving plate on the driving side of the first clutch arrangement;

a second clutch arrangement axially spaced from the first clutch arrangement, the second clutch arrangement having a plurality of intermeshing driven clutch discs and driving clutch discs;

a second clutch driving plate operably connected to the second driving clutch discs and the inner output shaft;

wherein the inner output shaft and second clutch driving plate are associated with an inner diameter of the second clutch driving discs to reduce the radial position of the center of gravity of the inner output shaft and second clutch driving plate on the driving side of the second clutch arrangement;

a common driven plate operably connected to the driven discs of the first and second clutch arrangements and the input shaft, an interface between the common driven plate and the first and second clutch driven discs being disposed radially outward relative to the driving plates of the first clutch and second clutch arrangements;

a first clutch pressure apply chamber being adjacent to a first clutch apply piston and a second clutch pressure apply chamber being adjacent to a second clutch apply piston, the first and second apply pistons each having an apply position where the piston is arranged to frictionally engage the respective driven set of clutch discs operably connected to the common driven plate and the driving set of clutch discs operably connected to the clutch driving plate to drive the clutch driving plate for rotation with the common driven plate when sufficient pressure is applied in the pressure apply chamber and an unapplied position where the piston is not arranged to frictionally engage the driven and driving set of clutch discs so the clutch driving plate is not driven for rotation with the common driven plate;

supplying fluid at a first flow rate to the first pressure apply chamber and supplying fluid at a second rate to the second apply chamber.

22. A method as set forth in claim 21 wherein the first rate is greater than the second rate.

23. A method as set forth in claim 21 further comprising reducing or shutting off the flow rate to the first apply chamber.

24. A method as set forth in claim 21 further comprising increasing the flow rate to the first pressure apply chamber and decreasing or shutting off the flow rate to the second pressure apply chamber.

* * * * *